(12) United States Patent
Zheng et al.

(10) Patent No.: US 12,012,711 B2
(45) Date of Patent: Jun. 18, 2024

(54) ECOLOGICAL SLOPE PROTECTION WITH EFFICIENT WATER PURIFICATION FUNCTION AND ECOLOGICAL IMPROVMENT METHOD

(71) Applicant: FUDAN UNIVERSITY, Shanghai (CN)

(72) Inventors: Zheng Zheng, Shanghai (CN);
Wenjing Sun, Shanghai (CN);
Xingzhang Luo, Shanghai (CN); Jian He, Shanghai (CN)

(73) Assignee: FUDAN UNIVERSITY, Shanghai (CN)

( * ) Notice: Subject to any disclaimer, the term of this patent is extended or adjusted under 35 U.S.C. 154(b) by 406 days.

(21) Appl. No.: 17/416,258

(22) PCT Filed: Mar. 28, 2019

(86) PCT No.: PCT/CN2019/080206
§ 371 (c)(1),
(2) Date: Jun. 18, 2021

(87) PCT Pub. No.: WO2020/147202
PCT Pub. Date: Jul. 23, 2020

(65) Prior Publication Data
US 2022/0074157 A1 Mar. 10, 2022

(30) Foreign Application Priority Data
Jan. 5, 2019 (CN) .......................... 201910037280.6

(51) Int. Cl.
*E02B 3/12* (2006.01)
*C02F 3/32* (2023.01)
(Continued)

(52) U.S. Cl.
CPC .............. *E02B 3/122* (2013.01); *C02F 3/327* (2013.01); *E02B 3/14* (2013.01); *C02F 2103/007* (2013.01)

(58) Field of Classification Search
CPC ... E02B 3/122; E02B 3/14; E02B 3/12; C02F 3/327; C02F 2103/007; C02F 3/341;
(Continued)

(56) References Cited

U.S. PATENT DOCUMENTS

| 8,101,079 B1 * | 1/2012 | Wanielista | .............. C02F 3/046 |
|---|---|---|---|
| | | | 210/906 |
| 2011/0100905 A1 * | 5/2011 | Ahn | .......................... C02F 1/42 |
| | | | 210/151 |
| 2019/0047888 A1 * | 2/2019 | Jin | ......................... B01D 24/22 |

FOREIGN PATENT DOCUMENTS

| CN | 101250014 A | * | 8/2008 | ................ C02F 3/06 |
|---|---|---|---|---|
| CN | 105174484 A | * | 12/2015 | |

OTHER PUBLICATIONS

"Case Study Collection Safety and Reliability with ACE Solutions" by ACE Geosynthetics and ACE Geosynthetics web site, <https://www.geoace.com/> (Year: 2019).*

* cited by examiner

*Primary Examiner* — Krishnan S Menon
(74) *Attorney, Agent, or Firm* — CBM PATENT CONSULTING, LLC (57) ABSTRACT

An ecological slope protection has an efficient water purification function, built in a land-lake ecozone along the bank of a basin, wherein the body of the ecological slope protection extends into the water of the basin, and has a flexible mattress laid on the surface thereof; an ecological filter pool is provided below the flexible mattress and is isolated from the water of the basin by means of the pool body; the ecological filter pool is contained with a filler layer and a
(Continued)

support layer, and the filler layer is supported by the support layer; the sewage pretreated via a sedimentation pool is introduced into the ecological filter pool and treated by the filler layer to clean up pollutants therein and reduce its eutrophication level; and the treated sewage is discharged from the ecological slope protection via the support layer and enters the basin.

15 Claims, 4 Drawing Sheets

(51) Int. Cl.
 *C02F 103/00* (2006.01)
 *E02B 3/14* (2006.01)
(58) Field of Classification Search
 CPC .......... C02F 2003/003; C02F 2101/105; C02F 2101/16; C02F 2101/20; C02F 2101/30; C02F 1/283; C02F 1/281; C02F 3/02; C02F 3/32; C02F 3/34
 See application file for complete search history.

ECOLOGICAL SLOPE PROTECTION WITH EFFICIENT WATER PURIFICATION FUNCTION AND ECOLOGICAL IMPROVMENT METHOD

TECHNICAL FIELD

The present invention relates to the technical field of water treatment, and particularly relates to a novel ecological slope protection with efficient water purification function for treating river sewage.

BACKGROUND ART

In 2016, in China, the total amounts of national wastewater discharge, chemical oxygen demand discharge, ammonia nitrogen discharge, nitrogen discharge, and phosphorus discharge were 71,109.54 million tons, 10.4653 million tons, 1.4178 million tons, 2.1211 million tons, and 139,400 tons, respectively, still far exceeding the environmental capacity. Among the nationally controlled sections of surface water in the country, 9.2% are even inferior to Category V, and 24.6% of the key lakes (reservoirs) are still in eutrophication.

Currently, in China, in view of reducing the pollution discharge load, the treatment of non-point source pollution has become the focus and the difficulty. Therefore, the research and development of methods for keeping basin sewage low-nitrogen and low-phosphorus is of great significance for reducing non-point source pollution load and improving environmental water quality in the country.

SUMMARY OF THE INVENTION

In order to overcome the above-mentioned problems, the inventors have made a great effort and provided a novel ecological slope protection with efficient water purification function, to control the pollution sources of basin water such as domestic sewage and surface runoff from both sides of the basin. According to the present invention, by building the ecological slope protection in a land-lake ecozone along the bank of the basin, an ecological water treatment system with microorganisms, plants, animals and fillers as main elements can be created, so that the denitrification and dephosphorization of sewage with high efficiency and the improvement of the environmental water quality can be realized effectively.

The object of the present invention is to provide the following technical solutions:
(1) A novel ecological slope protection with efficient water purification function built in a land-lake ecozone along the bank of a basin, wherein the body of the ecological slope protection 100 extends into the water of the basin and has a flexible mattress 110 laid on the surface thereof; an ecological filter pool 120 is provided below the flexible mattress 110 and is isolated from the water of the basin by sealing the pool body; the ecological filter pool 120 is contained with a filler layer and a support layer 125, and the filler layer is supported by the support layer 125; the sewage is introduced into the ecological filter pool 120 and treated by the filler layer to clean up pollutants therein and reduce its eutrophication level; and the treated sewage is discharged from the the ecological filter pool 120 via the support layer 125 and enters the basin.

(2) An ecological improvement method, preferably utilizing the ecological slope protection described in (1) above for ecological improvement.

The novel ecological slope protection with efficient water purification function and the ecological improvement method according to the present invention have the following beneficial effects:
(1) the surface layer of the ecological slope protection is covered with the flexible mattress composed of multi-layered composite materials, and the interior of the ecological slope protection is the ecological filter pool formed by grading fillers with different particle sizes, so that an ecological water treatment system with microorganisms, plants, animals, fillers and the like as main elements can be constructed;
(2) the ecological sewage treatment system according to the present invention is designed based on the ecological functions of earthworms such as swallowing organics, improving the water permeability and ventilation of soil, and the synergistic interaction between earthworms and microorganisms, and has good treatment effect on non-point source pollution;
(3) the ecological slope protection according to the present invention can be formed by reconstructing based on the original slope protection, so that the occupation of land resources is greatly reduced;
(4) the modular, large-scale and serialized device system of the ecological slope protection according to the present invention is easy for industrialized production, has low construction and operation costs, and is easy to maintain;
(5) the arrangement of the aeration pipe according to the present invention effectively solves the problem of oxygenation for the sewage in the ecological filter pool, and is beneficial for the survival of aerobic organisms in the sewage, and the removal of organic pollutants, nitrogen and phosphorus.

DESCRIPTION OF THE REFERENCE SIGNS

100—ecological slope protection
110—flexible mattress
120—ecological filter pool
121—soil layer
122—adjustment layer
123—biological layer 124—ecological layer
125—support layer
130—water distribution pipe
140—aeration pipe
150—drainage pipe
210—sedimentation pond

EMBODIMENTS

Hereinafter, the present invention will be further described in detail through the embodiments. Through these descriptions, the characteristics and advantages of the present invention will become clearer.

The term "exemplary" herein means "being considered as an example, an embodiment, or an illustration." Any "exemplary" embodiment described herein should not be construed as being superior or better than other embodiments. Although various aspects of the embodiments are shown in the drawings, unless otherwise noted, the drawings are not necessarily drawn to scale.

Figure 1:
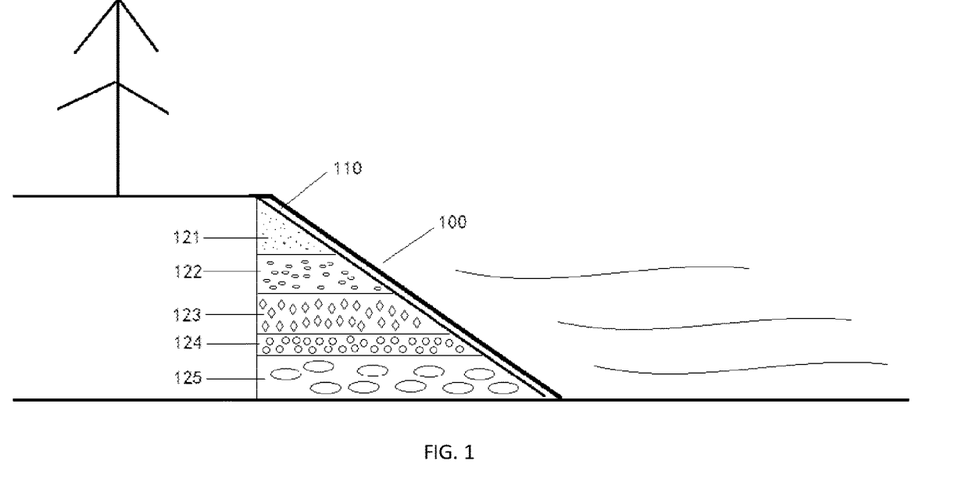
FIG. 1 shows a schematic cross-sectional structure diagram of the ecological slope protection according to one embodiment of the present invention.
Figure 2:
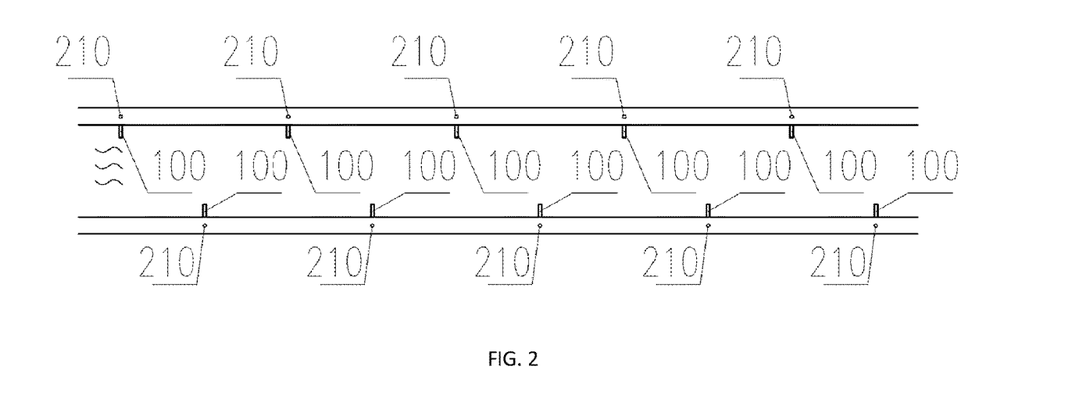
FIG. 2 shows a schematic diagram of the arrangement of river bank-ecological slope protection according to one embodiment of the present invention.

As shown in FIGS. 1 and 2, one object of the present invention is to provide a novel ecological slope protection with efficient water purification function built in a land-lake ecozone along the bank of a basin, wherein the body of the ecological slope protection 100 extends into the water of the basin and has a flexible mattress 110 laid on the surface thereof; an ecological filter pool 120 is provided below the flexible mattress 110.

The ecological filter pool 120 is isolated from the water of the basin by sealing the pool body, and is contained with a filler layer and a support layer 125 for supporting the filler layer. The sewage is introduced into the ecological filter pool 120 and treated by the filler layer to clean up pollutants therein and reduce its eutrophication level. The treated sewage is discharged from the the ecological filter pool 120 via the support layer 125 and enters the basin.

According to the present invention, a plurality of the ecological slope protections 100 separated at a predetermined interval are arranged along the basin water coast, forming an ecological slope protection group.

The flexible mattress 110 laid on the surface of the ecological slope protection 100 is woven from multilayer polymer fibers, and has pores with larger constant size of preferably 0.05 to 1 cm, more preferably 0.1 to 0.5 cm. The pores with this size can intercept silt in the water, which can bond into blocks in the gaps between the fibers, thereby providing a favorable condition for plants to take root (between the ecological filter pool 120 and the flexible mattress 110). The plants not only play a role of landscaping, but also create a suitable growth environment for fish, shrimps and molluscs, thereby forming a biosphere with the plant-animal-microbial food chain, rebuilding the original ecology and guaranteeing the biodiversity. The plants are aquatic plants, including but not limited to *Phalaris arundinacea*, alfalfa, ryegrass, *Dactylis glomerata*, vetiver grass and the like.

Furthermore, according to the present invention, the flexible mattress 110 can be made of one or more of non-woven fabrics, geotextiles, eco-bags, etc., which are woven from multilayer existing polymer fibers. Compared with traditional hard slope protection, the slope protection according to the present invention greatly reduces the consumption of resources such as stones.

Figure 5:
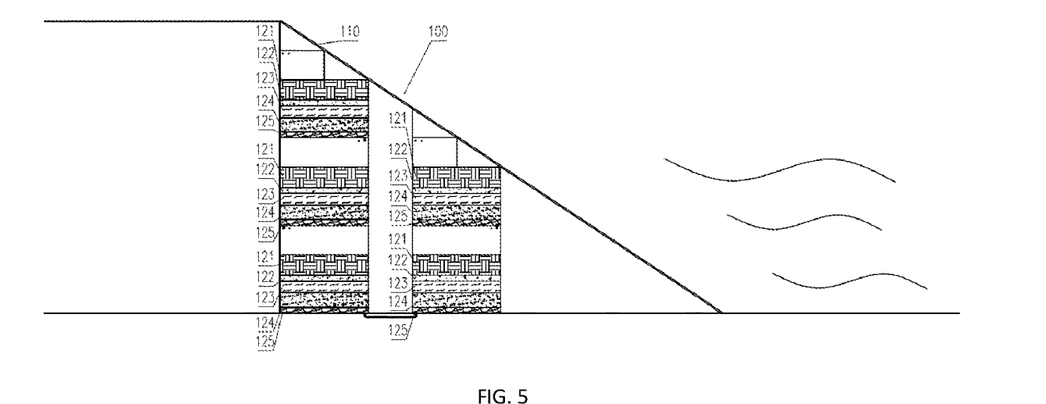
FIG. 5 shows a schematic structure diagram of the modular ecological slope protection according to one embodiment of the present invention.

As shown in FIGS. 1 and 5, according to the present invention, the filler layer of the ecological filter pool 120 is laminated by four functional layers from top to bottom as follows:

the first layer, which is a soil layer 121 for absorbing heavy metals, degrading organics and removing nitrogen and phosphorus;

the second layer, which is an adjustment layer 122 for supporting the soil layer 121, adsorbing and fixing the heavy metals, nitrogen, phosphorus and the organic materials;

the third layer, which is a biological layer 123 for adsorbing and fixing the heavy metals, degrading the organics and removing nitrogen and phosphorus;

the fourth layer, which is an ecological layer 124 for filtering water and intercepting the soil to avoid soil loss.

According to the present invention, the soil layer 121 is laid as the first layer, and has a thickness of 30 to 50 cm.

In one preferred embodiment, carbon is added into the soil layer 121, and then earthworms is stocked in the soil layer 121 to convert the soil layer 121 into an earthworm bed. The stocking density of earthworms is 8 to 12 g (earthworms)/L (filler). The carbon added includes but is not limited to wood chips, mushroom bran, straw, etc.

In one preferred embodiment, the earthworms are selected from Taihu red earthworms or *Pheretima guillelmi*, and the improved novel earthworm species have significantly improved flooding resistance and are more resistant to soiling.

By introducing the earthworms and the microorganisms in the soil layer and introducing the microorganisms in the biological layer 123, the ecological filter pool 120 can fully take advantage of the synergistic interaction between earthworms and microorganisms, and the functions of earthworms such as increasing the air and water permeability and swallowing organics, so that the sewage treatment can be performed much better and effectively. The earthworms can degrade the organics in the ecological filter pool 120, and additionally can promote the conversion and the mineralization of C, N, P through the grinding in their gizzard, the biochemical effect of their intestine and the synergistic interaction between earthworms and microorganisms. However, the main effects of earthworms are mechanical loosening and digesting in the soil layer, which are contributed to the physical cleaning of the filter bed and thus prevent soil hardening and blocking. The behaviors of earthworms in the filter pool can also effectively increase the amount and the activity of microorganisms, and thus promote the degradation and the conversion of organics.

According to the present invention, the adjustment layer 122 is laid as the second layer, which is formed by mixing the natural zeolite, limestone and activated carbon as a ratio of 1:1:1, and has a thickness of 10 to 30 cm.

The natural zeolite, limestone and activated carbon each have adsorption capacity due to their porous structures. Among them, especially the adsorption capacity of activated carbon is extremely strong, the adsorption capacity of the natural zeolite to heavy metals, ammonia nitrogen and organics is much better due to its molecule structure, and the limestone has an effective regulating effect on the acidity and alkalinity of water, which is beneficial to the growth of earthworms in the upper layer and the activity of microorganisms in the third biological layer 123. When the amount of natural zeolite is increased, the amounts of activated carbon and limestone are correspondingly reduced, so that the adsorption capacity to pollutants is reduced. When the amount of activated carbon is increased, the amounts of natural zeolite and limestone are correspondingly reduced, so that the supporting effect on the soil layer 121 and the regulating capacity to pH of water are reduced, although the adsorption capacity is improved. When the amount of limestone is increased, the amounts of natural zeolite and activated carbon are correspondingly reduced, the regulating capability to pH of water is improved, but the adsorption capability is reduced.

The natural zeolite, limestone and activated carbon in the adjustment layer 122 each individually have a particle size of 0.2 to 2.0 cm. The ecological filter pool 120 operates under the synergistic interaction of physics, chemistry and biology to effectively reduce or eliminate pollutants in the leachate, and the moderate dissolved oxygen is beneficial to the physical, chemical and biological reactions. The particle size of the fillers in the adjustment layer 122 is selected based on the coordination of gas flowing and adsorption of pollutants, so that poor gas flowing caused by the dense packing of fillers can be avoided, and at the same time, good adsorption capacity can be achieved.

According to the present invention, the biological layer 123 is laid as the third layer, and the filler in this layer is bacteria-loaded activated carbon, i.e. so-called biological activated carbon. This layer 123 has a thickness of 10 to 40 cm.

The bacteria loaded include nitrifying bacteria (nitrite bacteria and nitrate bacteria) and phosphorus-accumulating bacteria, which can be fixed on biochar by a carrier combination method (such as that disclosed in Chen Zhaohui, Zhang Han, et al. *Foul smell elimination and fertilizer efficiency enhancement of composting by immobilizing bacterial on biochar*[J]. Science Technology and Engineering, 2013, 13(32): 9592-9597+9618). Therefore, the efficiency of nitrogen and phosphorus removal can be improved by biochar adsorption in combination with microorganism metabolism.

Since the nitrifying bacteria can oxidize ammonia nitrogen into nitrite and nitrate, and the denitrifying bacteria can perform denitrification with organics and nitrate, the removal of nitrogen can be realized by the combination of both of them. The phosphorus accumulating bacteria can synthesize polyphosphate and accumulate the synthesized polyphosphate in cells under aerobic condition, and release phosphorus again under anaerobic condition. However, the phosphorus accumulating amount under aerobic condition is larger than the phosphorus releasing amount under anaerobic condition. Therefore, the phosphorus content in the percolate can be effectively controlled by adding the phosphorus accumulating bacteria.

The biological activated carbon has a particle size of 0.10 to 0.80 cm, which is contributed to realize the coexistence of aerobic environment and anaerobic environment and the functions of microorganisms.

According to the present invention, the ecological layer 124 is laid as the fourth layer, and the fillers in this layer 124 are one or more of waste materials such as fine sand, broken stone, steel slag, coal slag, construction waste, waste gypsum. The thickness of the ecological layer 124 is 10 to 40 cm, and the particle size of the filler is 0.1 to 5.0 cm.

The waste materials are idle in life and difficult to dispose, however, by using those materials in ecological construction, the utilization value of them can be improved, and the construction cost of the ecological slope protection 100 can be reduced. When the ecological layer 124 is filled with materials having adsorption properties, such as fine sand, crushed stone, coal slag, construction waste and waste gypsum, in addition to a filtering function, this layer 124 will also have a function of adsorbing heavy metals and organics.

According to the present invention, the support layer 125 is provided below the filler layer to support the filler thereon.

The filler is cobblestones, and has a particle size of 5.0 to 10.0 cm. The thickness of the support layer 125 is 5 to 15 cm.

Cobblestone is weathered rock, which has a porous structure and adsorption performance, so it can achieve adsorption and fixation of heavy metals and organics. At the same time, its lager size is contributed to discharge the water treated by four layers fillers through the drainage pipe 150 at the bottom of the ecological slope protection 100.

Figure 3:
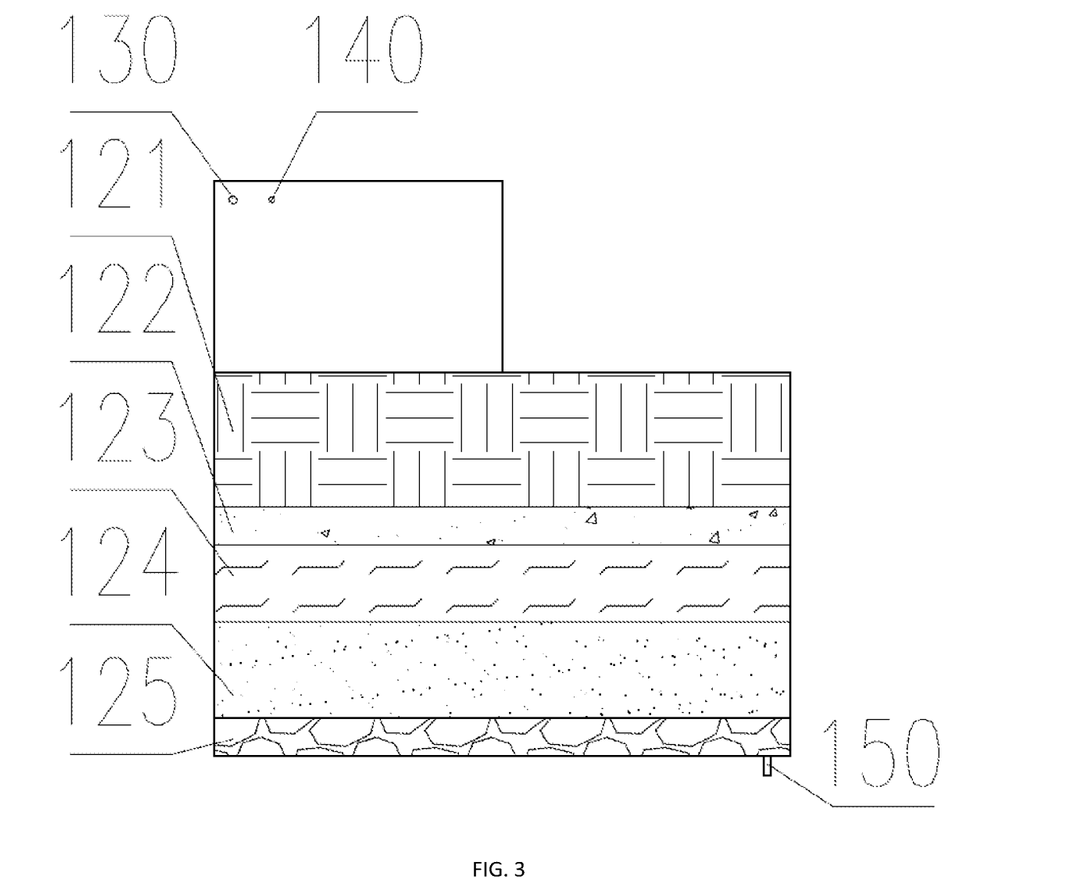
FIG. 3 shows a schematic structure diagram of the modular ecological filter pool according to one embodiment of the present invention.

As shown in FIG. 3, according to the present invention, sewage is introduced into the water distribution pipe 130 in the ecological slope protection 100 through a water pump. The water distribution pipe 130 is arranged above the soil layer 121 of the ecological filter pool 120 and made of PVC with 0.1 to 0.5 cm drain holes distributed thereon.

According to the present invention, a space for pipelines such as water distribution pipe 130 is reserved above the filler layer of the ecological filter pool (120), so as to arrange the pipelines such as water distribution pipe 130.

In one preferred embodiment, an inner water distribution pipe is further arranged in the filler layer, and preferably arranged at the interface between the soil layer 121 and the adjustment layer 122. Since the inner water distribution pipe may contact the fillers, it is wrapped by bluestones with geotextile on its periphery. By using the geotextile for filtering and using the bluestones for supporting, the possibility of blocking the drain holes by the wet fillers can be avoided.

In one preferred embodiment, an aeration pipe 140 is arranged beside the water distribution pipe 130 installed above the soil layer 121, and is connected with an external fan for aerating. By using the aeration pipe 140, the problem of oxygenation for sewage under the ecological slope protection 100 can be effectively solved. Furthermore, the arrangement of aeration pipe is beneficial for the survival of plant-earthworm-aerobic microorganisms, the removal of organic pollutants (mainly BOD) in the sewage, the nitrification of nitrogen-containing substances, and the dephosphorization of phosphorus-containing substances.

The aeration pipe 140 can also be a PVC pipe with 0.05 to 0.2 cm drainage holes distributed thereon.

Figure 4:
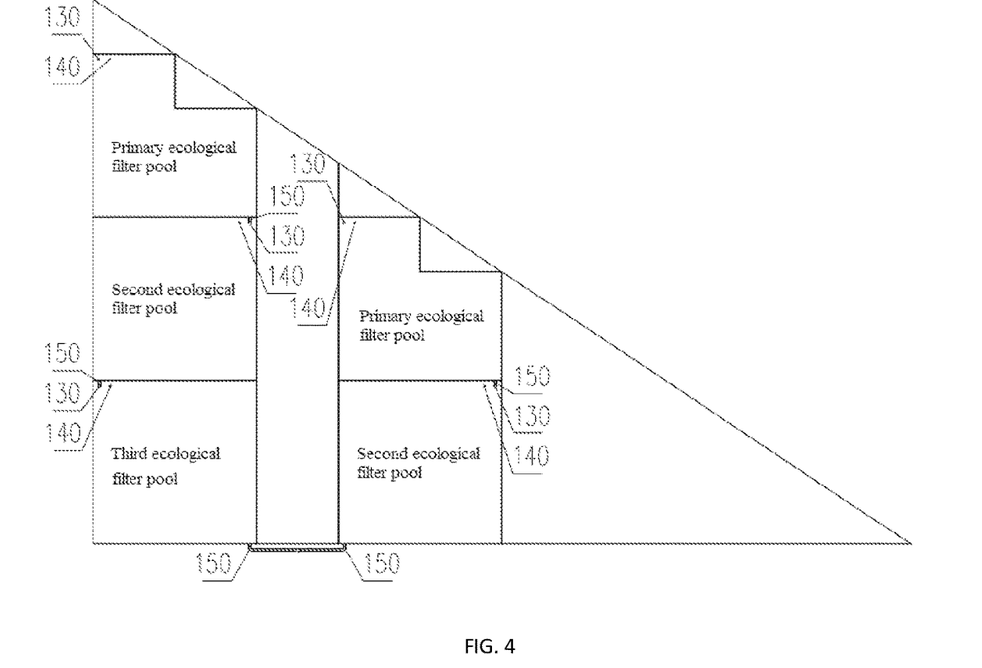
FIG. 4 shows a schematic structure diagram of the modular ecological slope protection according to one embodiment of the present invention.

As shown in FIGS. 4 and 5, in one preferred embodiment according to the present invention, the ecological slope protection 100 has a modular structure. Particularly, the body of the ecological filter pool 120 is made of the water-proof sheets, so that it can be assembled and disposed on site of water treatment and then be loaded with fillers in order, and each body can individually construct one ecological filter pool 120. Each ecological slope protection 100 may include one or more ecological filter pool(s) 120, and preferably, each ecological slope protection 100 includes at least two ecological filter pools 120. As shown in FIG. 1, the ecological slope protection 100 includes one ecological filter pool 120, and as shown in FIGS. 4 and 5, the ecological slope protection 100 includes a plurality of ecological filter pools 120.

Since the body of the ecological slope protection 100 extends into the basin water, and for some water bodies, the flow velocity of their lower part is higher than that of their upper part, and the sediment in the lower part is rich and coarse, if the ecological filter pools 120 constructing the ecological slope protection 100 are compactly arranged, the flow of the lower part of water may be significantly obstructed. As a result, the exchange of water on both sides of the ecological slope protection 100 may be affected and the strength of impact on the ecological slope protection 100 may be increased. Therefore, a plurality of the ecological filter pools 120 are stacked in layers and columns, the ecological filter pools 120 on each column are aligned, and the adjacent ecological filter pools 120 on each layer are separated at a predetermined interval, for example, 5 to 10 cm. Preferably, in order to facilitate the laying and fixing of the flexible mattress 110, the ecological filter pool 120 on the top layer is designed to be terraced, so that heavy objects can be placed at the terraced portion to press and fix the flexible mattress 110.

In one preferred embodiment, for the ecological filter pools 120 on the same column, the drainage pipes of the ecological filter pools 120 on the upper layer are connected with the water distribution pipes 130 of those on the lower layer to discharge the sewage treated by the upper layer into the soil layer 121; and the aeration pipes 140 of the ecological filter pools 120 on the upper layer are connected with the aeration pipes 140 of those on the lower layer. Preferably, the aeration pipe 140 of the ecological filter pool 120 on the lower layer has a larger aperture than that of the ecological filter pool 120 on the upper layer, which facilitates the gas transmission.

According to the present invention, the novel ecological slope protection 100 has a modular structure. The drainage pipe 150 at the bottom of the ecological filter pool 120 can be connected with the water distribution pipe 130 to realize multi-level unit series connection. All of the parts, such as the biological filter pool body, the water distribution pipe 130, the aeration pipe 140, and the drainage pipe 150, can be prefabricated, connected and assembled on site, and then buried under the slope, which are easy to install so as to greatly improve the construction speed, and furthermore, realize the equipmentization of sewage treatment facilities so as to facilitate the industrial production, the post-maintenance and the replacement of fillers.

In one preferred embodiment, a metal wire cage is sheathed on the periphery of each ecological filter pool 120 to increase the force points applied to the ecological filter pool 120. By applying force to the metal wire cage, the ecological filter pool 120 can be subjected to the operations such as replacement.

In one preferred embodiment, in case of the ecological slope protection 100 with a modular structure, only the soil layer 121 of the ecological filter pool 120 on the top layer is stocked with earthworms, and the stocking density of the earthworms is 8 to 12 g (earthworms)/L (filler).

In one preferred embodiment, the ecological slope protection 100 is an upright slope protection, and the direction in which the ecological slope protection 100 extends into water is approximately perpendicular to the shoreline, that is, the angle $\alpha$ with the shoreline is $85° \leq \alpha \leq 95°$. Alternatively, the ecological slope protection 100 is an upward-lifting slope protection, and in the direction of water flow, the angle $\alpha$ between the direction in which the ecological slope protection 100 extends into water and the shoreline is $95° < \alpha < 175°$; or the ecological slope protection 100 is a downward-lifting slope protection, in the direction of water flow, the angle $\alpha$ between the direction in which the ecological slope protection 100 extends into water and the shoreline is $5° < \alpha < 85°$. In areas with slow water flow, the angle between the ecological slope protection 100 and the shoreline can be within any range; in areas with fast water flow, the extension direction is designed according to the specific environment to achieve the energy and wave dissipation.

In one preferred embodiment according to the present invention, the sedimentation pond 210 is built on the bank close to the ecological slope protection 100.

The domestic sewage and surface runoff collected from both sides of the basin is introduced through the water inlet of the sedimentation pond 210 with a grille or filter screen, and the supernatant of the sewage after precipitated enters the ecological slope protection 100. In case of heavy rain causing excessive inflow, the sewage can be discharged directly into the basin after sedimentation.

As an effective auxiliary means to control the sewage pollutants, the sedimentation pond constructed according to the present invention can regulate the post-treatment of sewage.

Figure 6:
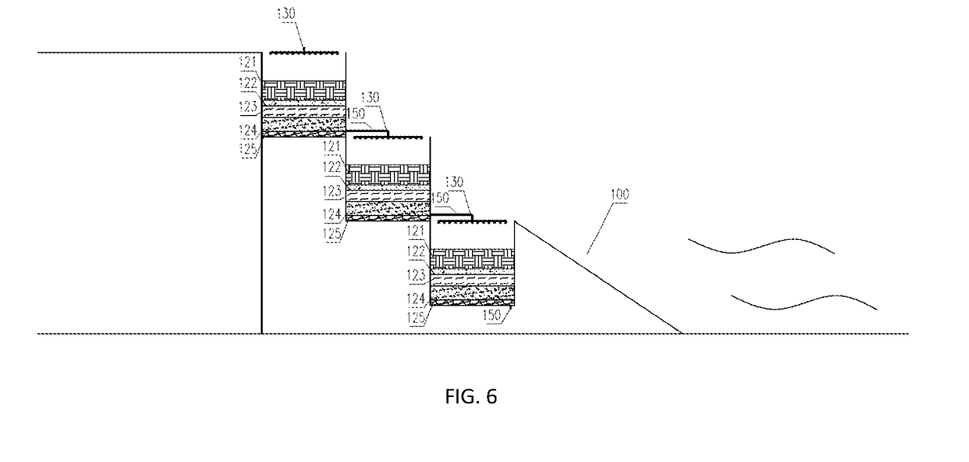
FIG. 6 shows a schematic structure diagram of the modular ecological slope protection according to one preferred embodiment of the present invention.

As shown in FIG. 6, in one preferred embodiment according to the present invention, a plurality of the modular ecological filter pools 120 are connected in series and arranged on the slope of the terraced ecological slope protection, so that the effect of the sewage pollutant treatment can be improved. In this embodiment, the aeration pipe is not demanded, and oxygen is provided for sewage treatment by water-dropping aeration. The surface soil of the ecological filter pool 120 is planted with plants and stocked with earthworms, thereby forming a biosphere with the plant-animal-microbial food chain, rebuilding the original ecology, guaranteeing the biodiversity, promoting the pollutant treatment and playing a role of landscaping. The plants are aquatic plants, including but not limited to *Phalaris arundinacea*, alfalfa, ryegrass, *Dactylis glomerata*, vetiver grass and the like, and the earthworms are selected from Taihu red earthworms or *Pheretima guillelmi*.

According to the present invention, since the body of the ecological slope protection extends into the basin water, the seeds of aquatic plants may be taken away by the water flow when they are sown under the flexible mattress 110 or in the flexible mattress 110, and thereby the plant coverage of the ecological slope protection 100 is decreased.

In order to improve the rooting rate of plant seeds in soil, the seeds are made into seed pellets containing the following components in parts by weight:

seeds 0.12 parts by weight;
inert substance 0.9-1.1, preferably 1.0 parts by weight;
viscosity substance 0.02-0.06, preferably 0.04 parts by weight;
active ingredients 0.03-0.05, preferably 0.04 parts by weight.

The inventor found that, as the the volume of the seeds is increased by preparing into the pellet, the seeds become more suitable for sowing and are not easy to be taken away by water flow, and the uniformity of sowing will be improved.

In one preferred embodiment, the inert substance includes one or more of river soil, farmland fluvo-aquic soil or kaolin, preferably river soil. According to the present invention, the inert substance is mainly used to change the shape and increase the volume of the seeds, and has the features such as safety, pulverization and dilution. When river soil or farmland fluvo-aquic soil, especially river soil, is selected as the inert substance, it can be obtained locally, and thus the cost is low.

In one preferred embodiment, the viscosity substance includes one or more of polyvinyl alcohol, polyvinyl acetate, methyl cellulose, carboxymethyl cellulose, hydroxypropyl cellulose, starch, attapulgite or red clay. According to the present invention, the viscosity substance has excellent water solubility and has no negative effects on seed germination. The addition of the viscosity substance during the preparation of the seed pellets can effectively increase the compression resistance of the seed pellets and reduce the crushing rate.

The inventors found that, based on 0.9 to 1.1 parts by weight of inert substance, when 0.02 to 0.06 parts by weight of the viscosity substance is added, the prepared seed pellets have higher compression resistance, lower crushing rate, and higher germination rate. When less than 0.02 parts by weight of the viscosity substance is added, the prepared seed pellets have lower compression resistance and are easy to break. When more than 0.06 parts by weight of the viscosity substance is added, the prepared seeds have improved compression resistance, reduced crushing rate and reduced germination rate.

According to one preferred embodiment of the present invention, the active ingredients include water absorbents, bactericides and stress resistance factors. Among them, the stress resistance factor is mainly used to improve the tolerance of seed germination and seedling growth to cold injury, salt-alkali and other stress conditions, and includes, for example, plant hormones or chemicals with plant hormone characteristics.

In a further preferred embodiment, the weight ratio of the water absorbent, the bactericide and the stress resistance factor is 0.5:(0.0005 to 0.0015):(0.0015 to 0.0025), preferably 0.5:0.001:0.002.

The water absorbent is selected from one or more of polyacrylamide, sodium polyacrylate or starch grafted acrylate. The added water absorbent can absorb and retain water hundreds or even thousands of times its own weight, thereby effectively increasing the weight of the seed pellet, immediately keeping seeds in contact with water, and improving the efficiency of seed germination and emergence.

The bactericide is selected from one or more of tebuconazole, hexaconazole, difenoconazole, propiconazole or tri-adimefon.

The stress resistance factor is selected from one or more of gibberellin, pentaaminolevulinic acid, chitosan, salicylic acid or sodium nitroferricyanide, preferably salicylic acid. By using salicylic acid as an active ingredient, the seedling root development and secondary root growth can be promoted, and the quality of seedlings can be significantly improved. Moreover, salicylic acid is not expensive, widely available, and suitable for scale applications.

Correspondingly, the present invention also provides a process for preparing seed pellets, including the following steps of:

I. Performing pre-treatment on seeds;
II. preparing components used in pelletizing;
III. mixing the seeds with the components to prepare seed pellets.

According to the present invention, the seeds are aquatic plant seeds and are not limited to a specific species.

The pre-treatment on seeds in step I includes the process of sterilizing, to reduce the influence of germs carried on the surface of seeds on subsequent germination and emergence of seeds. According to one preferred embodiment of the present invention, the seeds are subjected to a soaking disinfection treatment by using a potassium permanganate solution or a sodium hypochlorite solution.

Preferably, the mass fraction of the potassium permanganate solution is 1-4%, preferably 2-3%, and the soaking time in the potassium permanganate solution is 5-20 min, preferably 5-15 min. The mass fraction of the sodium hypochlorite solution is 0.5-2%, preferably 1-1.5%, and the soaking time in the sodium hypochlorite solution is 2-10 min, preferably 4-8 min.

In step II, the components used in pelletizing comprise the inert substance, the viscosity substance and the active ingredients. During the preparation of the seed pellets, the active ingredients are applied as a spray of their solution. The active substance solution can be prepared as follows: the stress-resistant factors, the water absorbent and the bactericide contained in the active ingredients are weighed respectively based on the weight ratio; the stress-resistant factors are dissolved, and then the water absorbent and the bactericide are sequentially dissolved to prepare the solution of the active ingredients. The prepared solution of the active ingredients is allowed to stand for 1 to 2 hours, and then placed in a spray device for later use.

Step III further comprises the following substeps:
III(a). weighing the seeds, the inert substance and the viscosity substance, well mixing, and adding into a container of a pelletizing device;
III(b). atomizing the active ingredients to pelletize; and
III(c). shaping and drying the pellets obtained by pelletizing.

According to the present invention, preferably, the active ingredients are delivered into the spray device, and after the pelletizing device is started, the solution of the active ingredients is atomized and uniformly sprayed onto the seeds.

In one preferred embodiment, the pelletizing rotation speed of the pelletizing device is 50-80 rpm/min and the pelletizing is carried out for a period of 15 min.

The seed pellets can be spherical or compressed into a flat shape.

In one preferred embodiment, the drying temperature is 35-40° C., and the moisture content of the pellets after drying is 12% or below 12%. with this moisture content, the seeds are easy to preserve and are not perishable or deteriorated.

Another object of the present invention is to provide an ecological improvement method, preferably utilizing the above-mentioned ecological slope protection for ecological improvement, and comprising constructing the ecological slope protection 100 in a land-lake ecozone along the bank of a basin, and preferably building the sedimentation pond 210 on the bank close to the ecological slope protection 100, wherein, the body of the ecological slope protection 100 extends into the water of the basin, and has a flexible mattress 110 laid on the surface thereof, and an ecological filter pool 120 is provided below the flexible mattress 110; the ecological filter pool 120 is isolated from the water of the basin by sealing the pool body, and is contained with a filler layer and a support layer 125 supporting the filler layer; the sewage is introduced into the ecological filter pool 120 and treated by the filler layer to clean up pollutants therein and reduce its eutrophication level, and the treated sewage is discharged from the ecological filter pool 120 via the support layer 125 and enters the basin.

The domestic sewage and surface runoff collected from both sides of the basin is introduced into the sedimentation pond 210, and the supernatant of the sewage after treated enters the ecological slope protection 100. The sedimentation pond 210 is also provided with a large-aperture drainage pipe directly communicated with the basin. In case of heavy rain causing excessive inflow, the sewage can be discharged directly into the basin through the drainage pipe after sedimentation.

EXAMPLES

Example 1

Taking a rural river in the Taihu Basin of Jiangsu Province as an example, the flow rate is 3000 m$^3$/d, and the conventional production of domestic sewage and surface runoff in the villages on both banks is about 300 m³/d. Therefore, the total treatment capacity of the novel ecological slope protections on both banks is designed to be 300 m³/d, to basically prevent pollutants from entering the river. As shown in FIG. 2, based on the hydraulic load of 0.5 m³/(m²·d), a total sum of 100 novel ecological slope protections were constructed by renovating alternately along the river banks, and each novel ecological slope protection handled 3 m³ of sewage per day.

As shown in FIGS. 4 and 5, the ecological slope protection 100 had a modular structure. Each novel ecological slope protection 100 consisted of two primary ecological filter pools (on the top layer), two secondary ecological filter pools (on the middle layer), and a third ecological filter pool (on the bottom layer), which were arranged in two columns and three rows. The primary ecological filter pool was irregularly terraced, and had a floor size of 2 m*1.5 m, a total height of 1.5 m, a step height of 1 m (0.5 m upper part of the ecological filter pool was provided to arrange the water distribution pipe 130, the aeration pipe 140 and the drainage pipe 150), a step depth of 0.75 m. The secondary/third ecological filter pool was a container with the shell size of 2 m*1.5 m*1.5 m. Sewage can optionally flow through the first column of ecological filter pools and/or the second column of ecological filter pools. In this example, sewage flowed through both the first column of ecological filter pools and the second column of ecological filter pools to improve the treatment speed. The ecological filter pools 120 were made of glass fiber reinforced plastics with good sealing, water leak proof and water impermeability characteristics, and were built by installing on-site. A metal wire cage was sheathed on the periphery of each ecological filter pool.

The intermittent water intake was implemented for 6 hours a day. The drainage pipe 150 was arranged at the bottom of each ecological filter pool, and cooperated with the water distribution pipe 130 having the same diameter. At the bottom of the whole ecological slope protection, two drainage pipes were converged into a large outlet pipe to drain into the river. The aeration pipes were arranged beside the water distribution pipes.

The flexible mattress 110 made by splicing the non-woven fabrics was covered on the surface of the ecological slope protection 100, and had a pore size of 0.05 to 1 cm. Under the flexible mattress, the ecological filter pools 120 were provided. Each ecological filter pool contained a 35 cm thick soil layer 121, a 10 cm thick adjustment layer 122 (composed of natural impurities, limestone and activated carbon with the mixing ratio of 1:1:1 and the particle size of 0.2 to 2.0 cm), a 20 cm thick biological layer 123 (biological activated carbon loaded with nitrous bacteria, nitrate bacteria and phosphorous accumulating bacteria, having a particle size of 0.10 to 0.80 cm), a 25 cm thick ecological layer 124 (fine sand, gravel, cinder, having a particle size of 0.1 to 5.0 cm), and a 10 cm thick supporting layer 125 composed of cobblestones (having a particle size of 5.0 to 10.0 cm). Taihu red earthworms were stocked in the soil layer of the primary ecological filter pool with a stocking density of 10 g (earthworms)/L (filler), and the soil layer was the active area for the earthworms.

The drain pipe 150 was arranged at the bottom of each filter pool, and the drain pipe 150 on the upper layer was seamlessly connected with the water distribution pipe 130 on the lower layer. The water distribution pipe 130 was disposed above the soil layer 121 of the ecological filter pool and in the filling layer (the interface between the soil layer 121 and the adjustment layer 122). The water distribution pipe 130 was a PVC pipe with 0.1 to 0.5 cm drain holes distributed thereon. The aeration pipe 140 was arranged beside the water distribution pipe 130 above the soil layer 121 of the ecological filter pool, to sufficiently supply the oxygen required for the decomposition of organics during the dropping of the sewage. The inner water distribution pipe arranged in the filling layer was wrapped by bluestones with geotextile on its periphery.

The sedimentation pond 210 was built on the bank close to the ecological slope protection 100. The domestic sewage and surface runoff collected from both sides of the basin was introduced through the water inlet of the sedimentation pond 210 with a grille or filter screen, and the supernatant of the sewage after precipitated entered the ecological filter pool 120.

After the ecological slope protection was built and operated for 9 months, in winter (March of the following year), the sewage introduced from the sedimentation pond was detected for several times. The average concentrations of the main pollutants were as follows: 54 mg/L of the suspended particulates; 206 mg/L of the chemical oxygen demand; 118 mg/L of the five-day biochemical oxygen demand, 4.4 mg/L of the total phosphorus, 37 mg/L of the ammonia nitrogen, and 49 mg/L of the total nitrogen. The effluent of the ecological slope protection was detected for several times. As the results showed, based on 100 ecological slope protections, the average removal rates of pollutants were as follows: 50%-80% of the suspended particulates, 50%-80% of the chemical oxygen demand, 50%-80% of the five-day biochemical oxygen demand, 30%-60% of the total phosphorus, 40%-70% of the ammonia nitrogen, and 40%-70% of the total nitrogen.

Example 2

The Composition Ratio of Seed Pellets
ryegrass seeds 0.12 Kg
inert substance (river soil) 1 Kg
viscosity substance (attapulgite) 0.05 Kg
water absorbent (starch grafted acrylate) 39.76 g
bactericide (tebuconazole) 0.08 g
stress-resistance factor (salicylic acid) 0.16 g
The Preparation of Seed Pellets Full, neat and robust ryegrass seeds were taken and soaked in a 2% potassium permanganate solution for 30 minutes to disinfect, and then were rinsed.

The river soil (inert substance) and the attapulgite (viscosity substance) were dried and crushed, and then were sieved by a 120-mesh sieve, respectively.

The seeds were mixed with the components for pelletizing to prepare the ryegrass seed nutritional pellets.

Specifically, 0.12 Kg of ryegrass seeds, 1 Kg of river soil powder and 0.05 Kg of attapulgite powder were weighed in sequence at the weight ratio of 0.12:1:0.05.

0.04 kg of active substances (salicylic acid, starch graft acrylate, and tebuconazole as the weight ratio of 0.002:0.5:0.001) were taken and dissolved into 100 mL acetone, and then after standing for 2 hours, were put in the liquid container of the spray device of the pelletizing apparatus. The pelletizing apparatus was started, adjusted to the speed of 50 rpm/min and operated for 15 minutes to pelletize the ryegrass seeds.

The prepared ryegrass seed pellets were pressed into a flat shape, and then were dried at 40° C. until the moisture content decreased below 12%.

100 seed pellets were randomly taken and placed on a wet paper bed. After disintegration, the seed existence rate of each seed pellet was detected one by one, and as a result, it was 100%. Then, 100 seed pellets were randomly taken and sown in the soil layer of the ecological filter pool in Example 1, and were covered by the flexible mattress on the surface. After observation and calculation, the germination rate was 98%.

The ryegrass pellets were sown in March of the second year after the ecological slope protection was built. The pellets grew to 0.4 m high and became mature ryegrasses over 25 days. In autumn (October), the sewage introduced from the sedimentation pond was detected for several times. The average concentrations of main pollutants were as follows: 20 mg/L of suspended particulates, 96 mg/L of chemical oxygen demand, 55 mg/L of five-day biochemical oxygen demand, 2.6 mg/L of total phosphorus, 20 mg/L of ammonia nitrogen, and 28 mg/L of total nitrogen. The effluent of the ecological slope protection was detected for several times. The results showed that the average removal rates of the main pollutants in the sewage of 100 ecological slope protections were as follows: 55%-85% of suspended particulates, 55%-85% of chemical oxygen demand, 55%-85% of five-day biochemical oxygen demand, 35%-65% of total phosphorus, 45%-75% of ammonia nitrogen, and 45%-75% of total nitrogen, which demonstrated that the planting of aquatic plants (ryegrass) had a synergistic effect on the removal of pollutants.

The present invention has been described in detail in combination with embodiments and examples. However, it should be noted that these are merely illustrative for the present invention and do not constitute any limitation to the scope of the present invention. Within the spirit and the scope of the present invention, it can be understood by those skilled in the art that various improvements, equivalent substitutions or modifications can be made to the technical content of the present invention and its embodiments, all of which fall in the scope of the present invention.

What is claimed is:

1. A novel ecological slope protection with efficient water purification function, built in a land-lake ecozone along the bank of a basin, wherein the body of the ecological slope protection (100) extends into the water of the basin, and has a flexible mattress (110) laid on the surface thereof; and an ecological filter pool (120) is provided below the flexible mattress (110);
wherein
the filling layer of the ecological filter pool (120) is laminated by four functional layers from top to bottom as follows:
the first layer, which is a soil layer (121) for absorbing heavy metals, degrading organics and removing nitrogen and phosphorus;
the second layer, which is an adjustment layer (122) composed of natural zeolite, limestone and activated carbon for supporting the soil layer (121), adsorbing and fixing heavy metals, nitrogen, phosphorus and organics;
the third layer, which is a biological layer (123) filled with bacteria-loaded activated carbon (so-called biological activated carbon) for adsorbing and fixing heavy metals, degrading organics and removing nitrogen and phosphorus;
the fourth layer, which is an ecological layer (124) filled with one or more of waste materials selected from fine sand, gravel, steel slag, cinder, construction waste and waste gypsum for filtering water and intercepting soil.

2. The ecological slope protection according to claim 1, wherein:
the ecological filter pool (120) is isolated from the basin water by sealing the pool body; the sewage is introduced into the ecological filter pool (120) and treated by the filler layer to clean up pollutants therein and reduce its eutrophication level; and the treated sewage is discharged from the ecological filter pool (120) via the support layer (125) and enters the basin.

3. The ecological slope protection according to claim 1, wherein:
a plurality of the ecological slope protections (100) separated at a predetermined interval are arranged along the basin water coast, to form an ecological slope protection group; and the flexible mattress (110) laid on the surface of the ecological slope protection (100) is woven from multilayer polymer fibers, and the flexible mattress (110) has pores with larger constant sizes of 0.05 to 1 cm.

4. The ecological slope protection according to claim 1, wherein:
earthworms are stocked in the soil layer (121), and the stocking density of the earthworms is 8 to 12 g (earthworms)/L (filler).

5. The ecological slope protection according to claim 1, wherein:
the sewage is introduced into the ecological slope protection (100) through a water distribution pipe (130) by means of a water pump, and the water distribution pipe (130) is disposed above the soil layer (121) in the ecological filter (120);
the water distribution pipe (130) is a PVC pipe, with 0.1 to 0.5 cm drain holes distributed thereon.

6. The ecological slope protection according to claim 5, wherein:
in the ecological slope protection (100) with a modular structure, the body of the ecological filter pool (120) is made of water-proof sheets;
each ecological slope protection (100) includes one or more ecological filter pool(s) (120).

7. The ecological slope protection according to claim 6, wherein:
a metal wire cage is sheathed on the periphery of each ecological filter pool (120);
in case of the ecological slope protection (100) with a modular structure, only the soil layer (121) of the ecological filter pool on the top layer is stocked with earthworms, and the stocking density of the earthworms is 8 to 12 g (earthworms)/L (filler).

8. The ecological slope protection according to claim 1, wherein:
a sedimentation pond (210) is built on the bank close to the ecological slope protection (100);
the domestic sewage and surface runoff collected from both sides of the basin is introduced through the water inlet of the sedimentation pond (210) with a grille or filter screen, and the supernatant of the sewage after sedimentation enters the ecological slope protection (100).

9. The ecological sloe protection according to claim 2, wherein the ecological filter pool (120) contains a filler layer and a support layer (125).

10. The ecological slope protection according to claim 3, wherein the flexible mattress (110) has pores with larger constant sizes of 0.1 to 0.5 cm.

11. The ecological slope protection according to claim 5, wherein an aeration pipe (140), which is a PVC pipe with 0.05 to 0.2 cm air vents distributed thereon, is arranged beside the water distribution pipe (130) disposed above the soil layer (121), and connected with an external fan to aerate.

12. The ecological slope protection according to claim 11, wherein an inner water distribution pipe is arranged in the filler layer, and wrapped by bluestones with geotextile on its periphery.

13. The ecological slope protection according to claim 6, wherein each ecological slope protection (100) includes at least two ecological filter pools (120).

14. The ecological slope protection according to claim 13, wherein a plurality of ecological filter pools (120) are stacked in layers and columns, the ecological filter pools (120) on each column are aligned, and the adjacent ecological filter pools (120) on each layer are separated at a predetermined interval.

15. The ecological slope protection according to claim 6, wherein for the ecological filter pools (120) on the same column, the drainage pipe of the ecological filter pool (120) on the upper layer is connected with the water distribution pipe (130) of the ecological filter pool (120) on the lower layer, and the aeration pipe (140) of the ecological filter pool (120) on the upper layer is connected with the aeration pipe (140) of the ecological filter pool (120) on a lower layer.

\* \* \* \* \*